US012587417B2

(12) United States Patent　(10) Patent No.: US 12,587,417 B2
Jeon et al.　(45) Date of Patent: Mar. 24, 2026

(54) APPARATUS AND METHOD OF PERFORMING CHANNEL SOUNDING

(71) Applicant: SAMSUNG ELECTRONICS CO., LTD., Suwon-si (KR)

(72) Inventors: Eunsung Jeon, Suwon-si (KR); Chulho Chung, Suwon-si (KR); Myeongjin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 18/609,354

(22) Filed: Mar. 19, 2024

(65) Prior Publication Data

US 2024/0323056 A1　Sep. 26, 2024

(30) Foreign Application Priority Data

Mar. 21, 2023　(KR) ........................ 10-2023-0036921

(51) Int. Cl.
*H04L 25/02*　(2006.01)
*H04L 5/00*　(2006.01)
*H04W 84/12*　(2009.01)

(52) U.S. Cl.
CPC ........ *H04L 25/0228* (2013.01); *H04L 5/0048* (2013.01); *H04W 84/12* (2013.01)

(58) Field of Classification Search
CPC .. H04B 7/0626; H04B 7/0617; H04B 7/0413; H04L 5/0055; H04L 25/0228; H04L 5/0048; H04L 25/0224; H04W 72/542; H04W 84/12
See application file for complete search history.

(56) References Cited

U.S. PATENT DOCUMENTS

| | | | |
|---|---|---|---|
| 10,219,285 | B2 | 2/2019 | Nabetani et al. |
| 10,298,304 | B2 | 5/2019 | Lim et al. |
| 10,826,588 | B2 | 11/2020 | Chun et al. |
| 11,165,547 | B2 | 11/2021 | Malek-Mohammadi et al. |
| 11,431,388 | B2 | 8/2022 | Arya et al. |
| 11,431,529 | B2 | 8/2022 | Cherian et al. |
| 11,463,885 | B2 | 10/2022 | Sun et al. |
| 2011/0235533 | A1* | 9/2011 | Breit ................... H04B 7/0452 370/252 |

(Continued)

FOREIGN PATENT DOCUMENTS

JP　　2017034561　　2/2017

OTHER PUBLICATIONS

Eunsung Jeon, Chulho Chung and Myeongjin Kim, IEEE 802.11-23/0783r0, Adaptive Sounding Using ML, Samsung, May 8, 2023 (Year: 2023).*

(Continued)

*Primary Examiner* — Aristocratis Fotakis
(74) *Attorney, Agent, or Firm* — Morgan, Lewis & Bockius LLP

(57) ABSTRACT

In a wireless local area network (WLAN) system including a first device and a second device, an operating method of the first device communicating with the second device via a channel includes collecting data related to a current state of the channel based on a signal received from the second device, predicting a probability of channel aging based on the data, and triggering a channel sounding process based on the prediction.

9 Claims, 17 Drawing Sheets

(56) References Cited

U.S. PATENT DOCUMENTS

| | | | | |
|---|---|---|---|---|
| 2016/0165607 A1* | 6/2016 | Hedayat | ............... | H04W 24/00 |
| | | | | 370/338 |
| 2019/0222270 A1* | 7/2019 | Schelstraete | ......... | H04B 7/0417 |
| 2020/0136699 A1* | 4/2020 | Mansour | ........... | H04W 74/0816 |
| 2020/0359299 A1* | 11/2020 | Suh | ...................... | H04B 7/0413 |
| 2021/0194629 A1* | 6/2021 | Shellhammer | ....... | H04B 7/0617 |
| 2021/0376895 A1* | 12/2021 | Xue | ..................... | H04B 7/0626 |
| 2022/0278795 A1 | 9/2022 | Go et al. | | |
| 2022/0360410 A1* | 11/2022 | Han | .................... | H04W 72/044 |
| 2024/0063927 A1* | 2/2024 | Yoon | ........................ | G06N 3/08 |

OTHER PUBLICATIONS

X. Ma, Q. Gao, J. Wang, V. Marojevic, and J. H. Reed, "Dynamic Sounding for Multi-User MIMO in Wireless LANs," IEEE Transactions on Consumer Electronics, 2017 (Year: 2017).*

Minchul Hong, Incheol Hwang, Jehun Heo and Daesik Hong, A New Scheduling Algorithm for Time-varying MIMO Channels with Channel Aging Metric, Yonsei University, Mar. 17, 2023 (Year: 2023).*

Ma, et al., "Dynamic sounding for multi-user MIMO in wireless LANs" in IEEE Transactions on Consumer Electronics, vol. 63, Issue: 2, May 2017, DOI: 10.1109/TCE.2017.014814, 11 pages.

* cited by examiner

RECEIVE ACK SIGNAL — S200b

COLLECT RSSI VALUES BY MEASURING RSSI VALUES FROM ACK SIGNAL — S210b

PREDICT PROBABILITY THAT CHANNEL AGING OCCURS BASED ON SECOND PREDICTION SCHEME — S220b

FIG. 7

| SNR | SNR_1 | · · · | SNR_x |
|---|---|---|---|
| Threshold | TH_1 | · · · | TH_x |

Server

1300

1160

Vehicle

1250

1200

Access Point

1140

Entertainment

1100

Home Gadget

1120

Home Appliances

APPARATUS AND METHOD OF PERFORMING CHANNEL SOUNDING

CROSS-REFERENCE TO RELATED APPLICATION

This application is based on and claims priority under 35 U.S.C. § 119 to Korean Patent Application No. 10-2023-0036921, filed on Mar. 21, 2023, in the Korean Intellectual Property Office, the contents of which are incorporated by reference herein in their entirety.

TECHNICAL FIELD

The inventive concept relates to a wireless communication, and more particularly, to an apparatus and method of performing channel sounding based on a certain protocol standard.

BACKGROUND

A wireless communication system includes multiple devices such as terminals, network devices, etc. Each of these devices exchange data, control information and reference signals in order to communicate with each other. The devices in a wireless communication system implement various technologies that enhance the date rate and throughput. That is, the technologies provide for a wireless communication system to support and improve the quality of communication between the devices. Examples of technologies for improving throughput may include beamforming, massive multiple-input multiple-output (MIMO), full-dimensional MIMO (FD-MIMO), antenna arrays, analog beamforming, large-scale antenna technologies, etc.

In some examples of the wireless communication, a wireless local area network (WLAN) may be a technology that connects two or more devices by a wireless signal transfer method. The WLAN technique may be based on the institute of electrical and electronics engineers (IEEE) 802.11 standard that specifies the set of media access control (MAC) and physical layer (PHY) protocols for implementing the WLAN computer communication. The 802.11 standard has evolved with 802.11b, 802.11a, 802.11g, 802.11n, 802.11ac, 802.11ax, etc. as the networking standard that may support a transmission speed up to 1 Gbyte/s based on orthogonal frequency-division multiplexing (OFDM) technology.

For example, a beamformer (e.g., base station) in a WLAN may transmit a signal to beamformee (e.g., user equipment) to find channel information between the beamformer and the beamformee. The beamformee may identify a channel with the beamformer based on the received signal. However, in some cases, as the number of beamformees communicating with the beamformer increases, the number of received signals from the beamformee also increases, which leads to a loss in data in the WLAN. Therefore, there is a need in the art for systems and methods that can enable recovery of the transmitted data.

SUMMARY

The present disclosure describes systems and methods for wireless communication. One or more embodiments of the present disclosure are configured to perform a channel sounding process that enhances the data transmittance between a beamformer and a beamformee. In some examples, a beamformer pre-emptively triggers a channel sounding process with a beamformee before a beamforming data transmittance is decreased based on an advance prediction of the generation of channel aging with the beamformee.

According to an embodiment of the present disclosure, in a wireless local area network (WLAN) system including a first device and a second device, an operating method of the first device includes collecting data of a current state of a channel based on a signal received from the second device, predicting a probability of channel aging based on the data, and triggering a channel sounding process based on the prediction.

According to an embodiment of the present disclosure, an operating method of a first device in a wireless local area network (WLAN) system includes performing data communication including a channel sounding process based on a prediction scheme with the second device via a channel, receiving a notification signal indicating that a probability of channel aging occurrence is high, determining that the channel sounding process is possible based on the notification signal, and triggering the channel sounding process based on the determination result.

According to an embodiment of the present disclosure, an operating method of an access point (AP) in a wireless local area network (WLAN) system includes collecting data of a current state of one or more channels based on signals received from a plurality of STAs, predicting a probability of channel aging based on the data, and triggering a channel sounding process based on the prediction.

BRIEF DESCRIPTION OF THE DRAWINGS

Embodiments of the inventive concept will be more clearly understood from the following detailed description taken in conjunction with the accompanying drawings:

FIG. 7 is a diagram for describing operation S310 of FIG. 6;

FIG. 14 is a conceptional view of an Internet of Thing (IoT) network system to which one or more embodiments of the inventive concept are applied.

DETAILED DESCRIPTION OF THE EMBODIMENTS

Figure 1:
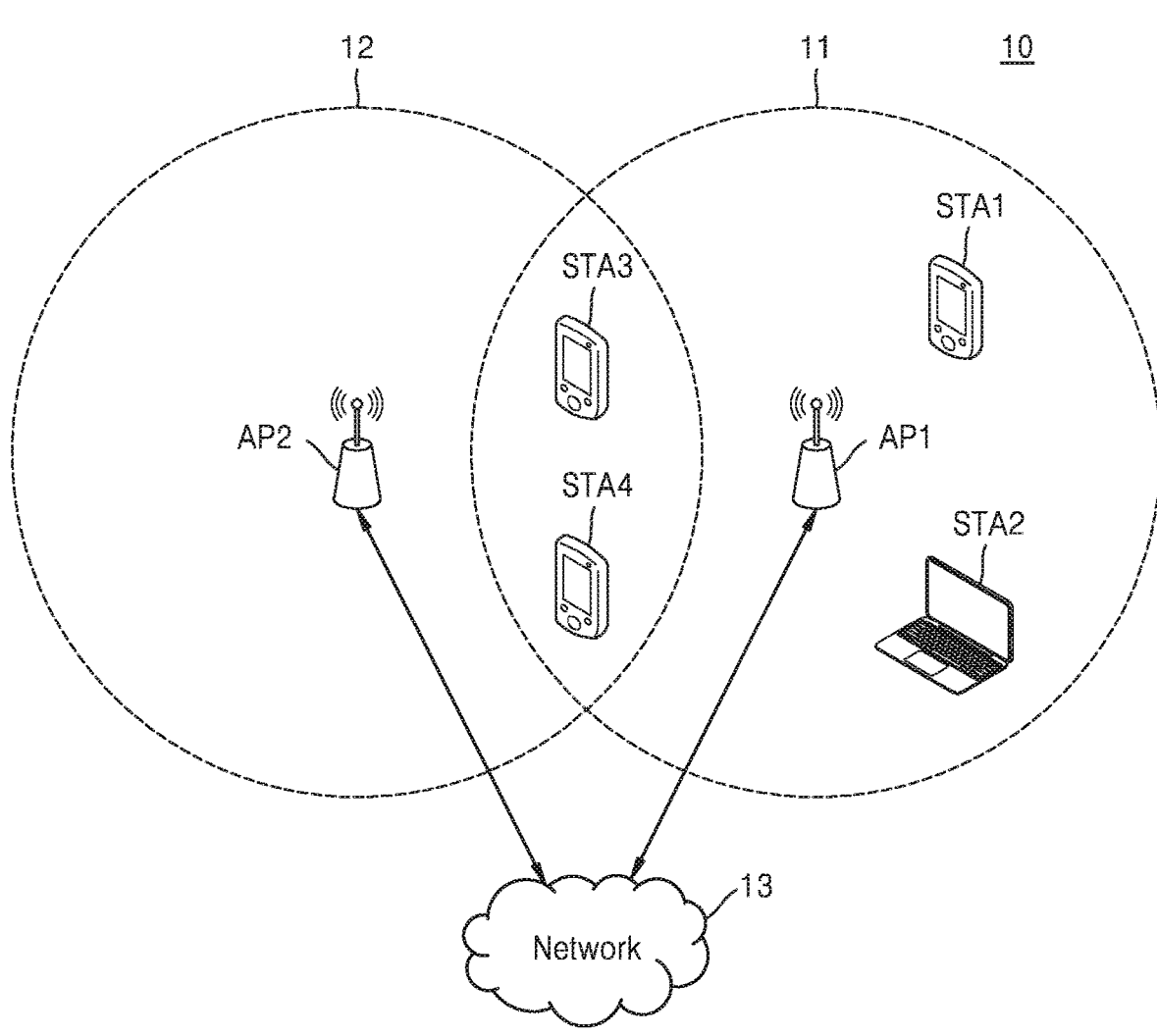
FIG. 1 is a diagram of a wireless communication system according to an embodiment of the inventive concept.

The present disclosure describes systems and methods for wireless communication. One or more embodiments of the present disclosure are configured to perform a channel sounding process that enhances the data transmittance between a beamformer and a beamformee. In some examples, a beamformer pre-emptively triggers a channel sounding process with a beamformee before a beamforming data transmittance is decreased based on an advance prediction of the generation of channel aging with the beamformee.

Conventional wireless communication systems perform an uplink beamforming process based on a beamformer (i.e., an access point) that transmits a trigger frame to a station (i.e., a beamformee) and receives a trigger-based (TB) sounding null data packet (NDP) from the beamformee. Next, the beamformer generates a compressed beamforming report (CBR) frame based on the TB sounding NDP and transmits the CBR frame and the trigger frame to the beamformee. The beamformee then performs the uplink beamforming process based on the CBR frame and the trigger frame. However, as the number of beamformees that communicate with the beamformer increases, the number of TB sounding NDPs received from the beamformees also increases. As a result, the data throughput from a wireless local area network (WLAN) system is degraded.

Embodiments of the present disclosure include systems and methods to increase a data throughput of a WLAN system by performing minimum signaling for uplink beamforming of stations (i.e., a beamformee). In some embodiments, an access point, e.g., a beamformer, transmits trigger frames to stations and controls an uplink beamforming. In some embodiments, the access point transmits an NDPA signal and NDP to the stations to provide for the stations to prepare for the uplink beamforming, and notifies whether the uplink beamforming is requested via a sub-field of the trigger frame.

According to some embodiments, the access point may request a beamformed A-MPDU from the stations using a newly defined trigger frame. The stations may generate the beamformed A-MPDU including the CBR frame and data in response to the new-type trigger frame. In some embodiments, the access point transmits the A-NPDU including trigger frames to the stations. The access point may control the uplink beamforming of the stations for each band via the A-MPDU.

Embodiments of the present disclosure include a multi-user multi-input multi-output (MU-MIMO) based wireless communication system. In case of a MU-MIMO communication, a beamforming process may be used to improve communication performance. In some examples, a beamformer (e.g., an access point) performs a beamforming process that includes a channel sounding process with a beamformee (e.g., a station) to receive feedback about a downlink channel from the beamformee. For example, the beamformer may determine a beamforming matrix based on the received feedback on the premise of reciprocity between a downlink channel and an uplink channel. The beamformer may perform a beamforming process on the data transmitted to the beamformee via the uplink channel based on the determined beamforming matrix.

In some cases, a channel between the beamformer and the beamformee may be changed due to various changes in environment over time. Accordingly, the beamformer may repeatedly perform the channel sounding process with the beamformee regularly or irregularly so as to determine an optimal beamforming matrix under a variable channel environment. By measuring the throughput of the beamforming data and triggering the channel sounding process, embodiments of the present disclosure can recover the transmitted beamforming data and prevent a data loss in a WLAN system.

Embodiments of the present disclosure include an operating method of a first device (e.g., a beamformer or an access point) that communicates with a second device (e.g., a beamformee or a station) in a wireless communication system (e.g., WLAN). In some cases, the first device collects data of a current state of a channel based on a signal received from the second device. Further, the first device predicts a probability of channel aging based on the data and determines whether to trigger a channel sounding process based on the prediction.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. The features described herein may be embodied in different forms and are not to be construed as being limited to the example embodiments described herein. Rather, the example embodiments described herein have been provided merely to illustrate some of the many possible ways of implementing the methods, apparatuses, and/or systems described herein that will be apparent after an understanding of the disclosure of this application.

The present disclosure may be modified in multiple alternate forms, and thus specific embodiments will be exemplified in the drawings and described in detail. In the present specification, when a component (or a region, a layer, a portion, etc.) is referred to as being "on," "connected to," or "coupled to" another component, it means that the component may be directly disposed on/connected to/coupled to the other component, or that a third component may be disposed therebetween.

Like reference numerals may refer to like components throughout the specification and the drawings. It is noted that while the drawings are intended to illustrate actual relative dimensions of a particular embodiment of the specification, the present disclosure is not necessarily limited to the embodiments shown. The term "and/or" includes all combinations of one or more of which associated configurations may define.

It will be understood that, although the terms "first," "second," etc. may be used herein to describe various components, these components should not necessarily be limited by these terms. These terms are only used to distinguish one component from another. For example, a first component could be termed a second component, and, similarly, a second component could be termed a first component, without departing from the scope of the inventive concept. The terms of a singular form may include plural forms unless the context clearly indicates otherwise.

The advantages and features of the present disclosure and methods to achieve them will be apparent by making reference to embodiments described in detail in conjunction with the accompanying drawings. However, the inventive concept is not limited to the embodiments shown below, but can be implemented in various forms that may be used interchangeably with each other. In addition, the inventive concept is provided to inform those of ordinary skill in the art to which the inventive concept belongs, the scope of the disclosure. The scope of the inventive concept is defined by the scope of the claims. In addition, specific configurations described in each embodiment of the inventive concept may be applicable to other embodiments.

The terms used in the present specification are used to describe particular embodiments, and are not intended to limit the inventive concept. An expression used in the singular encompasses the expression of the plural, unless it has a clearly different meaning in the context. It will be further understood that the terms "comprise" and/or "comprising" when used in this specification, specify the presence of stated elements, steps, operations, and/or devices, but do not preclude the presence or addition of one or more other elements, steps, operations, and/or devices thereof.

Unless otherwise defined, all terms (including technical and scientific terms) used herein have the same meanings as understood by one of ordinary skill in the art to which the inventive concept belongs. It will be further understood that terms defined in commonly used dictionaries should not be interpreted in an idealized or excessive sense unless expressly and specifically defined.

In addition, in describing the example embodiments, although orthogonal frequency-division multiplexing (OFDM) or orthogonal frequency division multiplexing access (OFDMA)-based wireless communication systems, in particular, IEEE 802.11 standards, will be mainly targeted, the technical concept is applicable to other communication systems having a similar technical background and channel form with slight modifications within the scope (i.e., not significantly departing from the scope of the present disclosure), which is possible at the discretion of a person skilled in the art of the present disclosure, wherein the communication systems having a similar technical background and channel form include, for example, a cellular communication system such as long term evolution (LTE), LTE-advanced (LTE-A), new radio (NR), wireless broadband (WiBro), global system for mobile communication (GSM) or a short-range communication system such as Bluetooth or near field communication (NFC).

In addition, various functions described below may be implemented or supported by artificial intelligence technology or one or more computer programs, and each of the programs consists of computer-readable program code and is embodied in a computer-readable medium. The terms "application" and "program" refer to one or more computer programs, software components, sets of instructions, procedures, functions, objects, classes, instances, related data, or portions thereof suitable for implementation of suitable computer-readable program code. The term "computer-readable program code" includes computer code of any type, including source code, object code, and executable code.

The term "computer-readable medium" includes any type of medium that may be accessed by a computer, such as read only memory (ROM), random access memory (RAM), a hard disk drive, a compact disk (CD), a digital video disk (DVD), or any other type of memory. A "non-transitory" computer-readable medium excludes wired, wireless, optical, or other communication links that transmit transitory electrical or other signals. A non-transitory computer-readable media includes media in which data may be permanently stored and media in which data is stored and may be overwritten later such as a rewritable optical disc or a removable memory apparatus.

In various embodiments, a hardware approach is provided as an example. However, because various example embodiments include technology using both hardware and software, the various example embodiments do not exclude a software-based approach.

Also, the terms used in the description provided below are examples provided for convenience of description. Accordingly, the embodiments are not limited to the terms described below, and other terms having equivalent technical meanings may be used.

Embodiments of the present disclosure include a wireless communication configured to receive a reference signal from a base station and estimate a first channel between the wireless communication device and the base station based on the reference signal. The present disclosure is not limited to any particular wireless network and may be applied to wireless communication systems having a similar technical background or channel configuration.

Hereinafter, a wireless communication system performing a channel sounding process of the embodiments of the present disclosure will be described in detail with reference to the accompanying drawings, wherein a wireless communication device uses a deep learning technique for performing nonlinear modeling for channel information reporting.

FIG. 1 is a diagram of a wireless communication system 10 according to an embodiment of the inventive concept. FIG. 1 shows a wireless local area network (WLAN) system as an example of the wireless communication system 10.

Referring to FIG. 1, the wireless communication system 10 may include first and second access points AP1 and AP2, a first station STA1, a second station STA2, a third station STA3, and a fourth station STA4. The first and second access points AP1 and AP2 may be connected to a network 13 including the Internet, an internet protocol (IP) network, or another arbitrary network. The first access point AP1 may connect the first station STA1, the second station STA2, the third station STA3, and the fourth station STA4 with the network 13 within a first coverage area 11 and the second access point AP2 may connect the third and fourth stations STA3 and STA4 with the network 13 within a second coverage area 12. In some cases, the first and second access points AP1 and AP2 may communicate with at least one of the first station STA1, the second station STA2, the third station STA3, and the fourth station STA4 based on wireless fidelity (WiFi) or another WLAN connection technology.

An access point may refer to a router, a gateway, etc., and a station may refer to a mobile station, a subscriber station, a terminal, a mobile terminal, a wireless terminal, user equipment, a user, etc. In some cases, the station may be a mobile device such as a mobile phone, a laptop computer, a wearable device, etc., or may be a stationary device such as a desktop computer, a smart TV, etc. In the specification, the access point may be referred to as a first device and the station may be referred to as a second device.

The first and second access points AP1 and AP2 may allocate at least one resource unit (RU) to at least one of the first to fourth stations STA1 to STA4. The first and second access points AP1 and AP2 may transmit data via the allocated at least one RU, and the at least one station may receive the data via the allocated at least one RU. According to the 802.11ax standard, the first and second access points AP1 and AP2 may allocate a single RU to at least one station. Additionally, according to the 802.11be (hereinafter, EHT) or next generation IEEE 802.11 standards (hereinafter, EHT+), the access points AP1 and AP2 may allocate a multi-resource unit (MRU) including two or more RUs to at least one station. For example, the first access point AP1 may allocate an MRU to at least one of the first station STA1, the second station STA2, the third station STA3, and the fourth station STA4 and may transmit data via the allocated MRU.

The first and second access points AP1 and AP2 may communicate with at least one of the first to fourth station STA1, STA2, STA3, and STA4 using a beamforming technique. For example, a single user beamforming may enhance reception performance of a single user and multi-user beamforming may enhance reception performance of multiple users by removing interferences among the multiple users.

Beamforming refers to a technique in signal processing that is used for directional signal transmission or reception. In some cases, beamforming can be performed by combining elements in an antenna array such that signals at particular angles experience constructive interference and the remaining signals experience destructive interference. Beamforming can be performed at the transmitting and receiving sides to control the phase and relative amplitude of the signal at each transmitter. Accordingly, a pattern of constructive and destructive interference is achieved in the wavefront resulting in spatial selectivity.

The access points AP1 and AP2 and the stations STA1 to STA4 may perform a channel sounding process for beamforming, and a channel sounding process may be based on a sounding protocol. The access points AP1 and AP2 may perform the channel sounding process with the stations STA1 to STA4 supporting various protocol standards (e.g., extremely high throughput (EHT), EHT+, etc.). Hereinafter, one or more embodiments of a channel sounding process between the first access point AP1 and the first station STA1 are described. The technical concept of the channel sounding between the first access point AP1 and the first station STA1 may be also applied to the second access point AP2 and the second to fourth stations STA2 to STA4.

Channel sounding refers to a process of evaluating the radio environment for wireless communication, especially MIMO systems. However, due to the blocking by buildings and natural obstacles, multiple paths are created between the transmitter and the receiver, with different time variances, phases and attenuations. Therefore, a measurement of the radio environment is needed to evaluate effectiveness of the multiple antenna systems. Channel sounding is a method that can estimate the channel characteristics for the simulation and design of antenna arrays resulting in improved performance.

According to an embodiment, the first access point AP1 may predict the probability of channel aging generation between the first access point AP1 and the first station STA1 and may determine whether to trigger a channel sounding process based on a prediction result. In some cases, a channel may be interpreted as a downlink channel used to transmit data that is beamformed by the access point to the station. Also, the generation of channel aging denotes that a beamforming data throughput using the previously predicted channel decreases and becomes less than a reference value due to the change in the channel. The first access point AP1 may trigger the channel sounding process before the channel aging occurs by predicting the generation of channel aging in advance.

According to an embodiment, the first access point AP1 may collect data for predicting the probability of generating the channel aging by using a signal received from the first station STA1 via the uplink channel. In some cases, the collected data is related to the current status of the uplink channel and the characteristics of the uplink channel that are changed over time may be identified via the collected data. In addition, the first access point AP1 may identify the characteristics of the downlink channel changed over time via the data collected based on the reciprocity between the uplink channel and the downlink channel.

According to an embodiment, the first access point AP1 may predict the probability of the channel aging generation based on the collected data and prediction scheme. In some cases, the prediction scheme may be an algorithm that inputs collected data and outputs a prediction of the probability of the channel aging generation. A plurality of prediction schemes with different types are described with reference to FIGS. 5A to 5C.

According to an embodiment, the first access point AP1 may use a prediction set in advance from among the plurality of prediction schemes. In some cases, the first access point AP1 may adaptively select and use at least one of the plurality of prediction schemes that are appropriate for the status or characteristics of the channel. Also, in some cases, the first access point AP1 may use at least two of the plurality of prediction schemes in combination. According to an embodiment, the type of collected data may vary depending on the type of the prediction scheme. Accordingly, the first access point AP1 may selectively collect the data appropriate for the prediction scheme that is to be used.

According to an embodiment, the first access point AP1 may compare a result that is generated by applying the prediction scheme to the collected data with a threshold value and may determine whether the generation of channel aging is predicted with a high probability based on the comparison result. In some examples, prediction of a high probability is based on comparison with a predetermined threshold value, i.e., a high probability indicates a probability above (or greater than) a threshold value. Further details regarding the generation of channel aging are described below with reference to FIG. 6. In some cases, the first access point AP1 may adaptively adjust the threshold value to be suitable for the current status of the channel. Details regarding the adjustment of the threshold values are described with reference to FIGS. 6 and 7.

According to an embodiment, the first access point AP1 inputs a set comprising a plurality of results generated by applying the prediction scheme to the collected data into a neural network model and may determine whether the generation of channel aging is predicted with a high probability based on the output from the neural network model. Further details regarding the neural network model are described with reference to FIG. 8. In some cases, the neural network model may be trained and generated based on supervised learning or unsupervised learning. Details regarding the supervised and unsupervised learning are described with reference to FIGS. 9A and 9B.

According to an embodiment, the first access point AP1 may receive, from the first station STA1, a notification signal indicating that the probability of the channel aging occurrence is high while performing data communication including the channel sounding process with the first station STA1 via the channel according to the set prediction scheme. In some cases, the first station STA1 may predict the probability of the channel aging occurrence based on the result of decoding the beamformed data transmitted from the first access point AP1 and may generate the notification signal based on the prediction result. The first access point AP1 may determine whether the current channel sounding process may be performed in response to the notification signal and may trigger the channel sounding process based on the determination result. According to some embodiments, the first access point AP1 may trigger the channel sounding process in response to the notification signal of the first station STA1 while the channel sounding process is performed based on the measurement result after measuring the beamformed data throughput. In some cases, channel sounding process is performed without predicting the probability of the channel aging occurrence which is described in detail with reference to FIG. 10.

In addition, the first access point AP1 may perform the data communication simultaneously with the first to fourth stations STA1 to STA4 using channels of different bands. Here, the first access point AP1 may collect data related to the current states of the channels using the signals received from the first to fourth stations STA1 to STA4 and may predict the probability of the channel aging occurrence in the channels based on the data and prediction scheme. Here, the prediction scheme used for the data communication with a plurality of stations (or multiple STAs) may be different from the prediction scheme used for the data communication with a single STA as described in detail with reference to FIG. 12. The first access point AP1 may determine whether to trigger the channel sounding process with respect to the first to fourth stations STA1 to STA4 based on the prediction result.

According to an embodiment of the present disclosure, the access point predicts the probability of channel aging and triggers the channel sounding process pre-emptively before the channel aging actually occurs to reduce the loss in data received by the station.

According to an embodiment of the present disclosure, the access point may effectively trigger the channel sounding process using at least one of the optimized prediction scheme, the threshold value, and the neural network model so that the probability of the channel aging occurrence may be precisely predicted.

According to an embodiment of the present disclosure, the access point may save the resource consumed to predict the probability of generating the channel aging occurrence, by receiving, from the station, the notification signal indicating that the probability of the channel aging occurrence is high.

According to an embodiment of the present disclosure, the access point may effectively trigger the channel sounding process using the prediction scheme suitable for the data communication with a single STA and the prediction scheme suitable for the data communication with a plurality of STAs.

Figure 2:
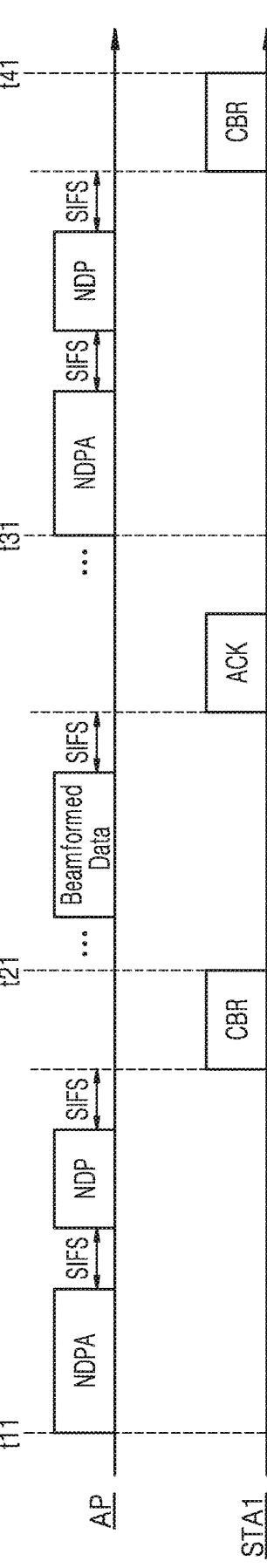
FIG. 2 is a timing diagram for describing a channel sounding process according to an embodiment of the inventive concept.

FIG. 2 is a timing diagram for describing a channel sounding process according to an embodiment of the inventive concept. The timing diagram of FIG. 2 represents channel sounding sections performed between the access point AP and the station STA1 and the data communication section.

Referring to FIG. 2, a section between time t11 and t21 is a section where the channel sounding process is performed and is referred to as a first channel sounding section. A section between time t21 and t31 is a section in which the data communication is performed and is referred to as a data communication section. A section between time t31 and t41 is a section in which a channel sounding process is performed and is referred to as a second channel sounding section.

In the first channel sounding section, the access point AP may transmit a null data packet announcement (NDPA) signal to the station STA. The access point AP may transmit a sounding null data packet (NDP) to the station STA after a short interframe space (SIFS) time passes. The station STA may transmit compressed beamforming report (CBR) feedback to the access point AP after the SIFS time has passed. The station STA estimates the downlink channel based on the sounding NDP and may generate the CBR feedback based on the estimation result.

In the data communication section, the access point AP may transmit beamformed data to the station STA. The access point AP may determine the beamforming matrix based on the CBR feedback received in the first channel sounding section and may generate beamformed data based on the determined beamforming matrix. The station STA may transmit to the access point AP an acknowledgment (ACK) signal that acknowledges successful reception of beamformed data after the SIFS time. Accordingly, the access point AP transmits a plurality of beamformed data to the station STA in the data communication section and may receive a plurality of ACK signals from the station STA.

According to an embodiment, the access point AP may regularly or irregularly predict the probability of channel aging occurrence in the data communication section. The access point AP may use the signal (for example, an ACK signal, channel information, or a notification signal regarding the current status of the channel, etc.) received from the station STA for performing the prediction. The access point AP may trigger the channel sounding process when it is predicted that the channel aging occurs at a certain point in time. That is, the access point AP finishes the communication operation in the data communication section and may perform the channel sounding process in the second channel sounding section.

The access point AP may update the beamforming matrix based on the channel (or estimated value for the channel) estimated in the second channel sounding section. The access point AP may generate and transmit beamformed data to the station STA based on the updated beamforming matrix in the data communication section.

Figure 3:
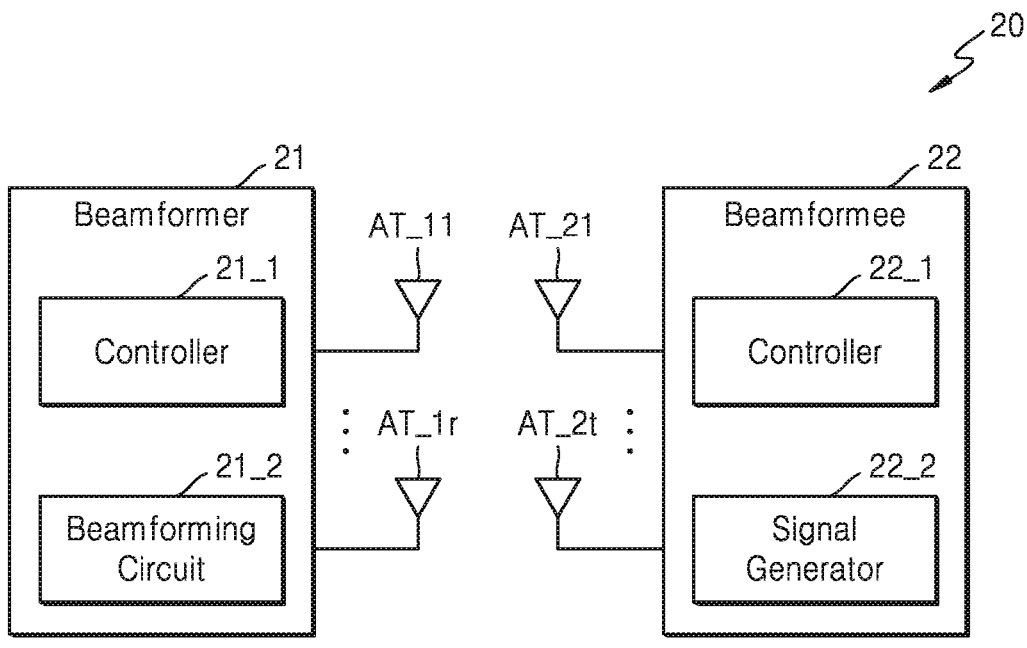
FIG. 3 is a block diagram of a wireless communication system according to an embodiment of the inventive concept.

FIG. 3 is a block diagram of a wireless communication system 20 according to an embodiment of the inventive concept. The block diagram of FIG. 3 represents a beamformer 21 and a beamformee 22 communicating with each other in the wireless communication system 20. Each of the beamformer 21 and the beamformee 22 may be an arbitrary device communicating in the wireless communication system 20 and may be referred to as a device for wireless communication. In some cases, the beamformer 21 and the beamformee 22 may be an access point (or first device) and a station (or second device), respectively, in a WLAN system. However, embodiments are not limited thereto, and the beamformer 21 may be a station (or second device) and the beamformee 22 may be an access point (or first device).

Referring to FIG. 3, the beamformer 21 may include a controller 21_1, a beamforming circuit 212, and a plurality of first antennas AT_11 to AT_1r. The beamformee 22 may include a controller 22_1, a signal generation circuit 222, and a plurality of second antennas AT_21 to AT_2t.

The beamformer 21 may transmit the beamformed data to the beamformee 22 via the plurality of first antennas AT_11 to AT_1*r*. The beamformee 22 may receive the beamformed data via the plurality of second antennas AT_21 to AT_2*t*.

The controller 211 may control the operations for communicating with the beamformee 22. For example, the controller 211 may control the channel sounding process and the data communication with the beamformee 22. In some examples, the controller 211 may transmit the NDPA signal and the sounding NDP to the beamformee 22 in the channel sounding process or may process the CBR feedback received from the beamformee 22 so that the beamforming circuit 21_2 may use the CBR feedback.

The beamforming circuit 212 may determine the beamforming matrix based on the CBR feedback. The controller 21_1 may generate the beamformed data by using the beamforming matrix determined by the beamforming circuit 21_2 and may transmit the beamformed data to the beamformee 22. The controller 211 may generate the beamformed data using the determined beamforming matrix in the data communication section till the next channel sounding process is performed.

According to an embodiment, the beamforming circuit 21_2 collects the data related to the current status of the channel using the signal received from the beamformee 22 in the data communication section and may predict the probability of the channel aging occurrence based on the collected data and the prediction scheme. Details regarding the prediction scheme are described with reference to FIGS. 5A to 5C, and details regarding predicting the probability of the channel aging occurrence are described with reference to FIGS. 6 to 8 and FIGS. 9A and 9B. The beamforming circuit 21_2 may determine whether to trigger the channel sounding process based on the prediction result. For example, when the occurrence of channel aging is predicted, the beamforming circuit 21_2 may trigger the channel sounding process by requesting the controller 21_1 to perform the channel sounding process. The controller 21_1 may terminate the data communication with the beamformee 22 in response to the request from the beamforming circuit 21_2 and may perform a new channel sounding process. Next, the beamforming circuit 21_2 may update the beamforming matrix based on the CBR feedback received from the beamformee 22 in the new channel sounding process. In some cases, updating the beamforming matrix may be understood as that a beamforming matrix suitable for the current channel status is newly determined or the previous beamforming matrix is adjusted.

According to an embodiment, the beamforming circuit 212 may determine whether to trigger the channel sounding process in response to the notification signal received from the beamformee 22 in the data communication section. In some cases, the notification signal indicates that the channel aging may occur with a high probability.

The controller 22_1 of the beamformee 22 may control the overall operation for communication with the beamformer 21. For example, the controller 22_1 may control the channel sounding process and the data communication with the beamformer 21. In some cases, the controller 22_1 may transmit the CBR feedback to the beamformer 21 in the channel sounding process or may transmit the ACK signal for the beamformed data to the beamformer 21.

According to an embodiment, the signal generation circuit 22_2 may generate a signal that is necessary for the beamforming circuit 212 to predict the probability of the channel aging occurrence. In some cases, the signal that is necessary for predicting the probability of the channel aging occurrence may include at least one of the ACK signal and channel information related to the current channel status. In some embodiments, the signal generation circuit 22_2 may generate a notification signal indicating that the probability of the channel aging occurrence is high. The controller 22_1 may transmit the signal generated by the signal generation circuit 22_2 in the data communication section to the beamformer 21.

Referring to FIG. 3, the controller 21_1 and the beamforming circuit 21_2 of the beamformer 21, and the controller 22_1 are separate from the signal generation circuit 22_2 of the beamformee 22. However, the configuration is merely used to describe the operations of the beamformer 21 and the beamformee 22. Thus, embodiments are not limited thereto, and the controller 21_1, the beamforming circuit 212, the controller 22_1, and the signal generation circuit 22_2 may be integrated as one processing circuit or may be respectively implemented in various circuits. Additionally, the operations of the controller 21_1 and the beamforming circuit 21_2 are understood as the operation of the beamformer 21, and the operations of the controller 22_1 and the signal generation circuit 22_2 are understood as the operation of the beamformer 22.

Figure 4:
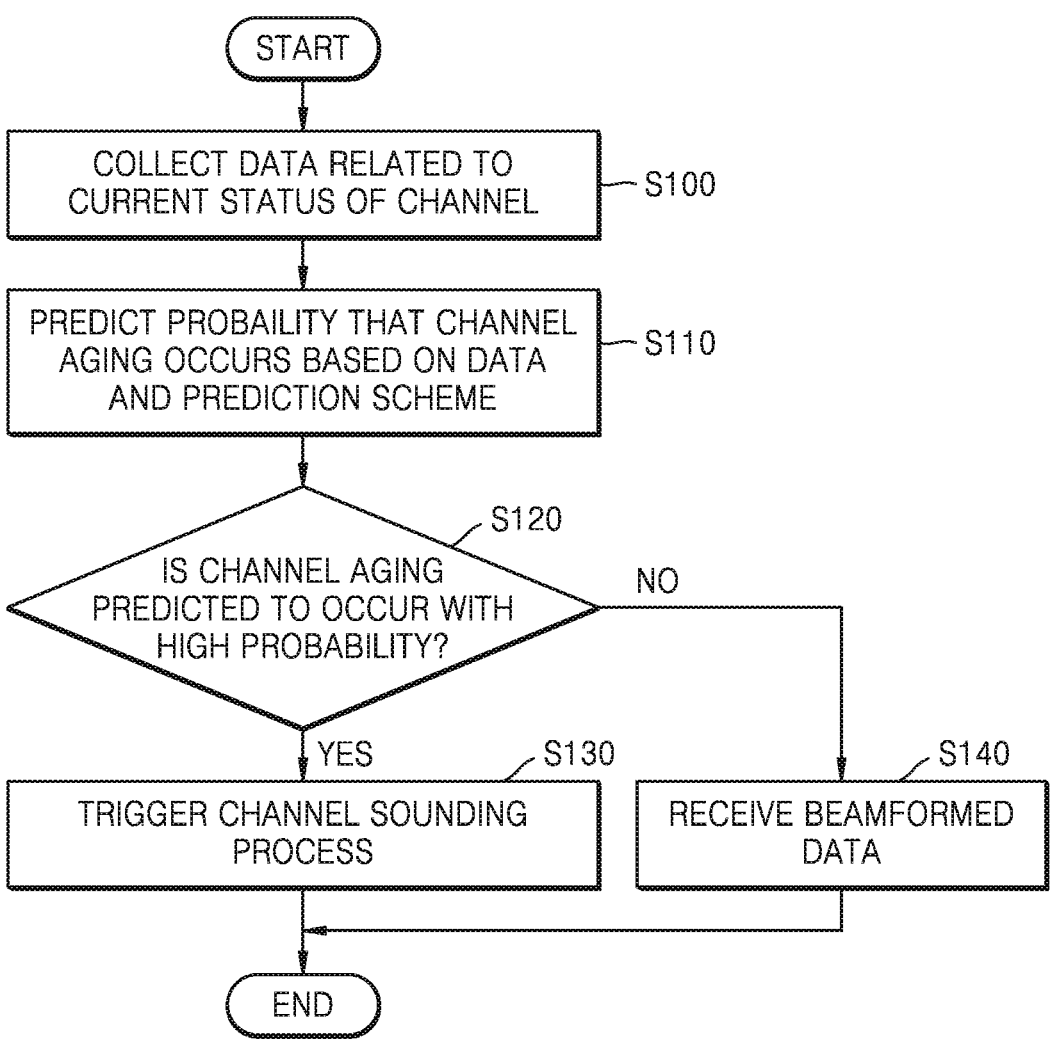
FIG. 4 is a flowchart for describing a method of operating an access point, according to an embodiment of the inventive concept.

FIG. 4 is a flowchart for describing a method of operating an access point, according to an embodiment of the inventive concept.

Referring to FIG. 4, in operation S100, the access point may collect data related to the current channel status. According to an embodiment, the access point may collect the data using the signal received from the station. For example, the access point may use the ACK signal received from the station. In another example, the access point may use the channel information received from the station.

In operation S110, the access point may predict the probability of channel aging occurrence based on the data collected in operation S100 and the prediction scheme. According to an embodiment, the access point may predict the probability of channel aging occurrence by applying the collected data to the prediction scheme. In some cases, the operation of predicting the probability of channel aging occurrence may be understood as an operation of generating a result indicating the probability by applying the collected data to the prediction scheme.

In operation S120, the access point may determine whether the channel aging is predicted to occur with high probability (based on the determination in operation S110). In some cases, the access point may determine whether the channel aging is predicted to occur with high probability based on a comparison result by comparing the probability predicted in operation S110 with a threshold value. In some cases, the access point may determine the threshold value based on the current channel status and may perform operation S120 using the determined threshold value. Thus, the access point may determine that the channel aging is predicted to occur with high probability when the probability of occurrence predicted in operation S120 exceeds the threshold value.

When operation S120 is YES, the access point may trigger the channel sounding process in operation S130. The access point may update the beamforming matrix based on the estimated value with respect to the channel, which is generated by performing the second channel sounding process with the station (as described with reference to FIG. 2), and may transmit, to the station, the data beamformed based on the updated beamforming matrix.

When operation S120 is NO, the access point may transmit the beamformed data to the station in operation S140.

Thus, the access point may transmit, to the station, the data beamformed based on the previously determined beamforming matrix since the access point identifies that the determined beamforming matrix is available in operation S120.

Figure 5A:
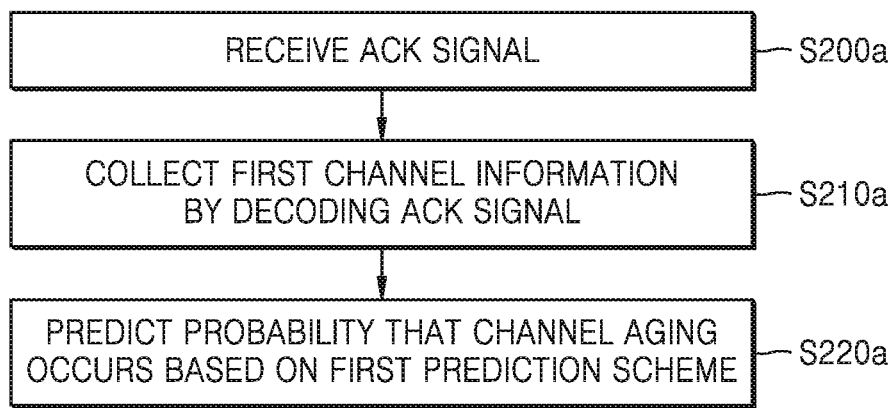
FIGS. 5A to 5C are flowcharts for predicting a channel aging probability, according to an embodiment of the inventive concept.
Figure 5B:
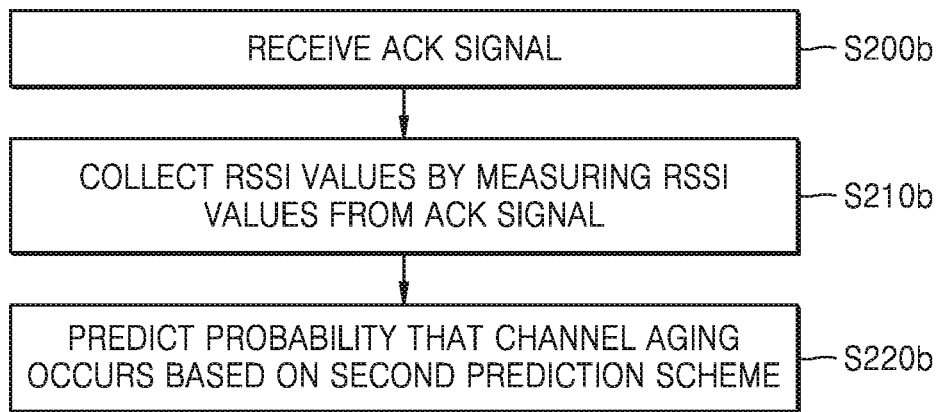
Figure 5C:
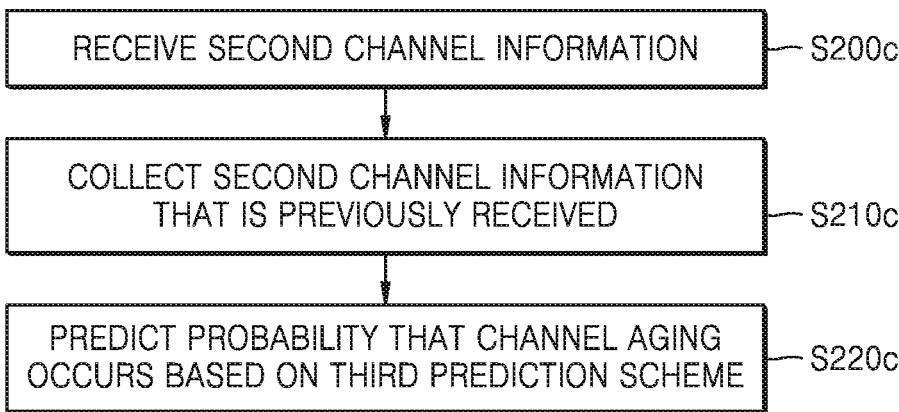

FIGS. 5A to 5C are flowcharts for describing a method of predicting a probability of channel aging occurrence according to an embodiment of the inventive concept. Hereinafter, the description is provided with further reference to FIG. 3, and the beamformer 21 may be the access point and the beamformee 22 may be the station.

Referring to FIGS. 3 and 5A, in operation S200a, the beamformer 21 may receive the ACK signal from the beamformee 22. The ACK signal may be the response of the beamformee 22 to the beamformed data received from the beamformer 21. For example, the beamformer 21 may receive the ACK signals transmitted from the signal generator 22_2 via second antennas AT_21 to AT_2t of the beamformee 22 and via the first antennas AT_11 to AT_1r of the beamformer 21 using f subcarriers.

In operation S210a, the beamformer 21 may collect first channel information by decoding the ACK signal. The first channel information may be generated based on Equation 1.

$$\hat{H}_{i,j}(f, t) \tag{1}$$

$\hat{H}_{i,j}(f, t)$ is a frequency response of a sub-channel between an i-th second antenna AT-2i and a j-th first antenna AT_1j having f subcarriers at a time t(t=1, 2, . . . , T), referred to as first channel information. In addition, a plurality of sub-channels are formed between the first antennas AT_11 to AT_1r and the second antennas AT_21 to AT_2t. Thus, the plurality of sub-channels may form the channels between the beamformer 21 and the beamformee 22. In addition, $\hat{H}_{i,j}(f, t)$ may be repeatedly generated over time with a certain time period.

In operation S220a, the beamformer 21 may predict the probability of the channel aging occurrence based on a first prediction scheme. According to an embodiment, the first prediction scheme calculates temporal distribution of $\hat{H}_{i,j}(f, t)$ and the distribution may be utilized as a value indicating the probability of the channel aging occurrence.

For example, the probability of the channel aging occurrence may be generated based on Equation 2.

$$\sigma_H^2(T) = \frac{1}{N_f N_t N_r} \sum_{j=0}^{N_r-1} \sum_{i=0}^{N_t-1} \tag{2}$$
$$\sum_{f=0}^{N_f-1} \left[ \frac{1}{T} \sum_{t=0}^{T-1} |\hat{H}_{i,j}(f, t)|^2 - \left( \frac{1}{T} \sum_{t=0}^{T-1} |\hat{H}_{i,j}(f, t)| \right)^2 \right]$$

Here, $N_f$ denotes the number of subcarriers, $N_r$ denotes the number of first antennas AT_11 to AT_1r of the beamformer 21, and $N_t$ denotes the second antennas AT_21 to AT_2t of the beamformee 22. $\sigma_H^2(T)$ may correspond to an average value of the temporal distributions of first channel information during a period T and may indicate the probability of generating the channel aging. The beamformer 21 may determine whether the channel aging is predicted to occur with a high probability based on whether $\sigma_H^2(T)$ exceeds the threshold value.

In some cases, the probability of the channel aging occurrence may be generated based on Equation 3.

$$\sigma_H^2(T)' = \max_{j,i,f} \left[ \frac{1}{T} \sum_{t=0}^{T-1} |\hat{H}_{i,j}(f, t)|^2 - \left( \frac{1}{T} \sum_{t=0}^{T-1} |\hat{H}_{i,j}(f, t)| \right)^2 \right] \tag{3}$$

$\sigma_H^2(T)'$ may correspond to the maximum distribution from among the temporal distributions of first channel information during a period T and may indicate the probability of the channel aging occurrence. The beamformer 21 may determine whether the channel aging is predicted to occur with a high probability based on whether $\sigma_H^2(T)'$ exceeds the threshold value.

In some cases, the probability of the channel aging occurrence may be generated based on Equation 4.

$$\Delta_H(t + \Delta) = \frac{1}{N_f N_t N_r} \sum_{j=0}^{N_r-1} \tag{4}$$
$$\sum_{i=0}^{N_t-1} \sum_{f=0}^{N_f-1} |\hat{H}_{i,j}(f, t + \Delta) - \hat{H}_{i,j}(f, t)|, \Delta > 0$$

$\Delta_H(t+\Delta)$ may correspond to an average value of variations in first channel information between adjacent arbitrary times and may indicate a probability of the channel aging occurrence. The beamformer 21 may determine whether the channel aging is predicted to occur with a high probability based on whether $\Delta_H(t+\Delta)$ exceeds the threshold value.

However, embodiments in which the probability of the channel aging occurrence is predicted according to at least one of Equation 1 to Equation 4 above are examples, and thus embodiments are not limited thereto. Thus, the probability of the channel aging occurrence may be variously predicted based on a combination of Equation 1 to Equation 4 or another equation.

Referring to FIG. 5B, in operation S200b, the beamformer 21 may receive the ACK signal from the beamformee 22.

In operation S210b, the beamformer 21 may collect received signal strength indicator (RSSI) values by measuring the RSSI values corresponding to different antennas with a certain time period from the ACK signal. The RSSI value may be expressed by Equation 5 below.

$$RSSI_j(t) \tag{5}$$

$RSSI_j(t)$ denotes the RSSI value measured by a j-th first antenna AT_1j at a point in time t.

In operation S220b, the beamformer 21 may predict the probability of the channel aging occurrence based on a second prediction scheme. In an embodiment, the second prediction scheme calculates distributions of $RSSI_j(t)$ and the distribution may be utilized as a value indicating the probability of the channel aging occurrence.

In some cases, the probability of the channel aging occurrence may be generated based on Equation 6.

$$\sigma_{RSSI}^2 = \frac{1}{N_r} \sum_{j=0}^{N_r-1} \left[ \frac{1}{T} \sum_{t=0}^{T-1} (RSSI_j(t))^2 - \left( \frac{1}{T} \sum_{t=0}^{T-1} RSSI_j(t) \right)^2 \right] \tag{6}$$

$\sigma_{RSSI}^2$ may correspond to an average value of the temporal distributions of the RSSI values during a period T and may indicate the probability of the channel aging occurrence. The beamformer 21 may determine whether the channel aging is predicted to occur with a high probability based on whether $\sigma_{RSSI}^2$ exceeds the threshold value.

In some cases, the probability of the channel aging occurrence may be generated based on Equation 7.

$$\sigma_{RSSI}^2{}' = \max_j \left[ \frac{1}{T} \sum_{t=0}^{T-1} (RSSI_j(t))^2 - \left( \frac{1}{T} \sum_{t=0}^{T-1} RSSI_j(t) \right)^2 \right] \quad (7)$$

$\sigma_{RSSI}^{2}{}'$ may correspond to the maximum distribution from among the temporal distributions of the RSSI values during a period T and may indicate the probability of the channel aging occurrence. The beamformer 21 may determine whether the channel aging is predicted to occur with a high probability based on whether $\sigma_{RSSI}^{2}{}'$ exceeds the threshold value.

In some cases, the probability of the channel aging occurrence may be generated based on Equation 8.

$$\Delta_{RSSI}(t + \Delta) = \frac{1}{N_r} \sum_{j=0}^{N_r-1} |RSSI_j(t + \Delta) - RSSI_j(t)|, \Delta > 0 \quad (8)$$

$\Delta_{RSSI}$ (t+Δ) may correspond to an average value of variations in the RSSI values between adjacent arbitrary times and may indicate a probability of the channel aging occurrence. The beamformer 21 may determine whether the channel aging is predicted to occur with a high probability based on whether $\Delta_{RSSI}$ (t+Δ) exceeds the threshold value.

However, embodiments in which the probability of the channel aging occurrence is predicted according to at least one of Equation 5 to Equation 8 above are examples, and thus, embodiments are not limited thereto. The probability of the channel aging occurrence may be variously predicted based on a combination of Equation 5 to Equation 8 or another equation.

Referring to FIG. 5C, in operation S200c, the beamformer 21 may receive second channel information from the beamformee 22. In some cases, the second channel information may denote channel quality information provided from the beamformee 22 to the beamformer 21. The second channel information may include at least one of a modulation & coding scheme (MCS) level and a signal to noise ratio (SNR) level determined by the beamformee 22. In detail, the beamformee 22 may report channel information to the beamformer 21 in real-time when a link adaptation method is applied. The beamformee 22 may estimate the current downlink channel and determine at least one of the MCS level and the SNR level based on the estimated value and may report the determined at least one level to the beamformer 21.

In case of communication technologies, modulation and coding scheme (MCS) refers to the numbers of useful bits which can be carried by a symbol. In some cases, the symbol is defined as resource element (RE) and MCS refers to the number of useful bits that can be transmitted per RE. MCS depends on radio signal quality in wireless link. For example, modulation refers to the number of bits carried by a single RE irrespective of whether it is a useful bit or parity bits. Additionally, a code rate can be defined as the ratio between useful bit and total transmitted bit. Thus, MCS defines the number of useful bits per symbol.

In operation S210c, the beamformer 21 may collect the second channel information received from the beamformee 22.

In operation S220c, the beamformer 21 may predict the probability of the channel aging occurrence based on a third prediction scheme. For example, the probability of the channel aging occurrence may be generated based on Equation 9 or Equation 10.

$$\Delta_{MCS} = MCS(t) - MCS(t-1) \quad (9)$$

Here, $\Delta_{MCS}$ may correspond to the variation amount between a current MCS level and the previous MCS level and may denote the probability of the channel aging occurrence. The beamformer 21 may determine whether the channel aging is predicted to occur with a high probability based on whether $\Delta_{MCS}$ exceeds the threshold value.

$$\Delta_{SNR} = SNR(t) - SNR(t-1) \quad (10)$$

Here, $\Delta_{SNR}$ may correspond to the variation amount between the current SNR level and the previous SNR level and may denote the probability of the channel aging occurrence. The beamformer 21 may determine whether the channel aging is predicted to occur with a high probability based on whether $\Delta_{SNR}$ exceeds the threshold value.

However, embodiments in which the probability of the channel aging occurrence is predicted according to at least one of Equation 9 and Equation 10 above are examples, and thus, embodiments are not limited thereto. The probability of the channel aging occurrence may be variously predicted based on a combination of Equation 9 and Equation 10 or another equation.

Figure 6:
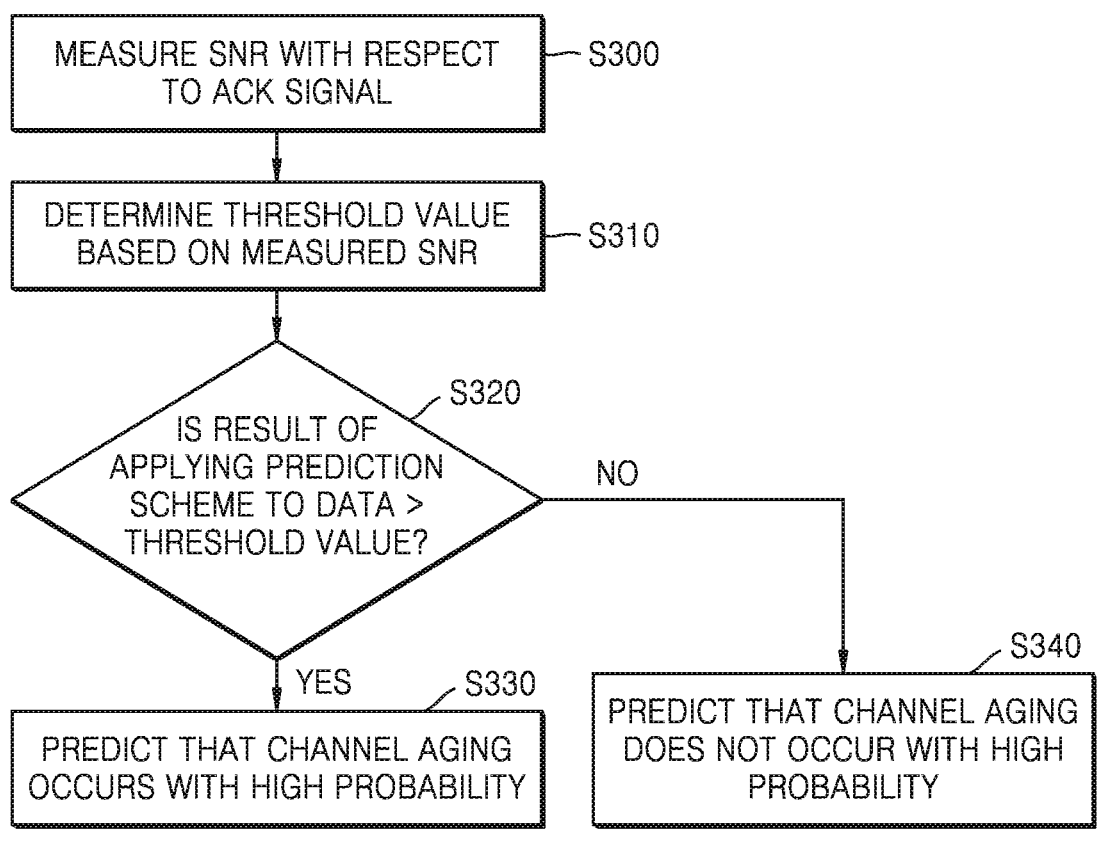
FIG. 6 is a flowchart for determining whether channel aging in an access point is predicted to occur, according to an embodiment of the inventive concept.

FIG. 6 is a flowchart for describing a method of determining whether the channel aging is predicted to occur in an access point, according to an embodiment of the inventive concept. FIG. 7 is a diagram for describing operation S310 in detail.

Referring to FIG. 6, in operation S300, the access point may measure the SNR with respect to the ACK signal received from the station.

In operation S310, the access point may determine a threshold value based on the SNR measured in operation S300. Referring to FIG. 7, the access point may select the threshold value mapping to the measured SNR value with reference to a table stored in a memory. In some cases, SNR values SNR_1~SNR_x may be respectively mapped to different threshold values TH_1~TH_x.

Referring again to FIG. 6, in operation S320, the access point may determine whether a result of applying the prediction scheme to the collected data exceeds the threshold value determined in operation S310. In some cases, the prediction scheme may be one of the first to third prediction schemes described with reference to FIGS. 5A to 5C or may be a combination of at least two of the schemes.

When operation S320 is YES, i.e., in operation S330, the access point may predict that the channel aging may occur with high probability. Accordingly, the access point triggers the channel sounding process with the station.

When operation S320 is NO, i.e., in operation S340, the access point may predict that the channel aging is not predicted to occur with high probability. Accordingly, the access point may continuously transmit the beamformed data to the station.

Figure 8:
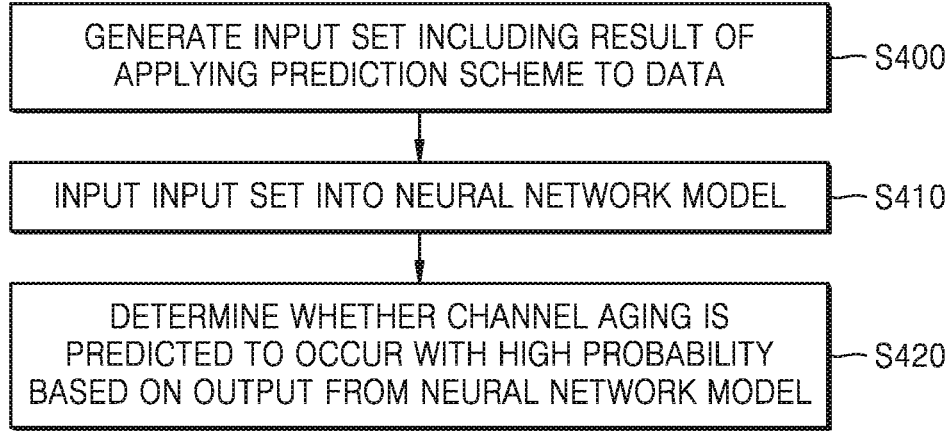
FIG. 8 is a flowchart for predicting a probability that channel aging occurs using a neural network model according to an embodiment of the inventive concept.

FIG. 8 is a flowchart for a method of predicting a probability of channel aging occurrence using a neural network model according to an embodiment of the inventive concept.

Referring to FIG. 6, in operation S400, the access point may generate an input set including the results of applying the prediction scheme to the data. In some cases, the input set may include at least two of the value generated by the first prediction scheme described with reference to FIG. 5A, the value generated by the second prediction scheme described with reference to FIG. 5B, and the value generated by the third prediction scheme described with reference to FIG. 5C.

In operation S410, the access point may input the input set generated in operation S400 into the neural network model.

In operation S420, the access point may determine whether the channel aging is predicted to occur with high probability based on an output from the neural network model. In some cases, the neural network model may generate an output that may directly indicate that the channel aging is predicted to occur with high probability by processing the input set. The access point may determine whether the channel aging is predicted to occur with high probability by identifying the output from the neural network model.

Figure 9A:
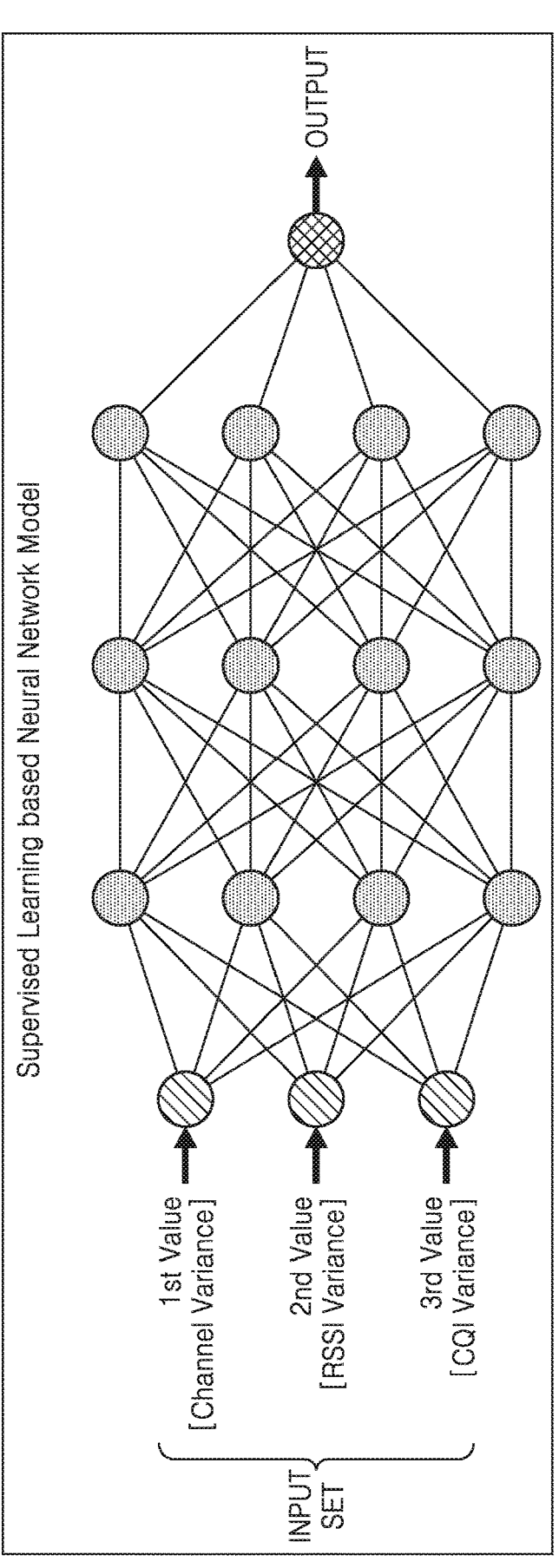
FIGS. 9A and 9B are diagrams for describing a neural network model according to an embodiment of the inventive concept.
Figure 9B:
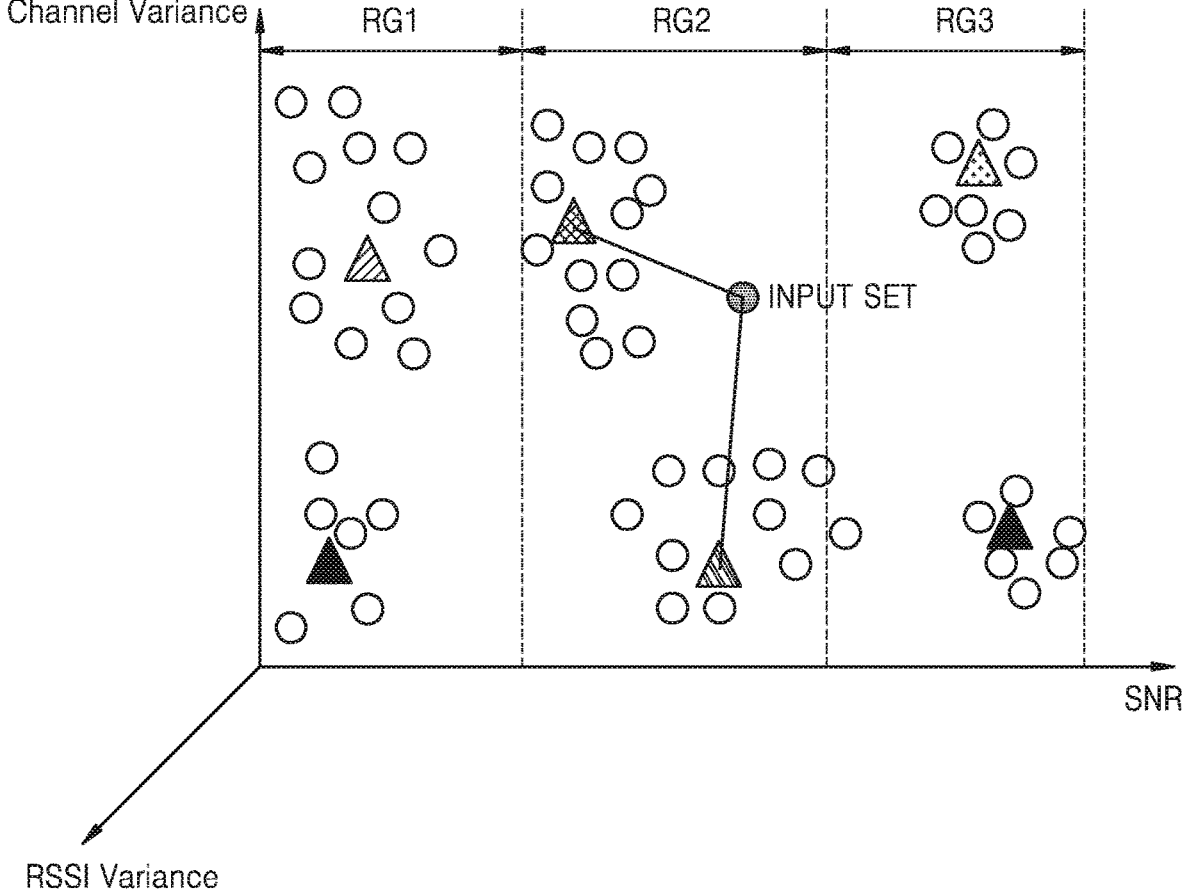

FIGS. 9A and 9B are diagrams for describing a neural network model according to an embodiment of the inventive concept.

Referring to FIG. 9A, the neural network model is trained based on supervised learning and may determine whether the channel aging is predicted to occur with high probability. According to an embodiment, the input set that is input to the neural network model may include a first value related to the channel distribution, a second value related to the RSSI distribution, and a third value related to the channel quality (or channel quality information). The first to third values included in the input set are used to identify the variation in the channel and may be generated by the first to third prediction schemes described with reference to FIGS. 5A to 5C.

According to an embodiment, the neural network model may generate the output based on the input set. In some cases, the output may indicate whether the channel aging is predicted to occur with high probability when considering the change in the channel status according to the input set.

According to an embodiment, the neural network model is trained by using a first training input set under the situation where the channel aging occurs and may be trained by using a second training input set under the situation where the channel aging does not occur. Additionally, the neural network model may be trained a plurality of times while changing various communication parameters.

Referring to FIG. 9B, the neural network model is trained based on unsupervised learning and may determine whether the channel aging is predicted to occur with high probability. According to an embodiment, the input set that is input to the neural network model may include a first value related to the channel distribution, a second value related to the RSSI distribution, and a third value related to the SNR. The first and second values included in the input set are used to identify the variation in the channel and may be generated by the first and second prediction schemes described above with reference to FIGS. 5A and 5B. Also, the third value related to the SNR included in the input set may be measured by the access point side.

The third value corresponds to the X-axis, the first value corresponds to the Y-axis, and the second value corresponds to the Z-axis in the neural network model and may be classified as first to third regions RG1 to RG3 according to the SNR value. In the first to third regions RG1 to RG3, a first data cluster in which the channel aging occurs and a second data cluster in which the channel aging does not occur may be separately arranged.

For example, the neural network model identifies that the region of the SNR in which the input set is included is the second region RG2 and may determine whether the channel aging is predicted to occur with high probability based on which of the two data clusters arranged in the second region RG2 is adjacent to the SNR region by using a certain algorithm (e.g., a K-mean algorithm).

According to an embodiment, the neural network model may be trained by generating the first data cluster from the first training input set under the situation in which the channel aging occurs and generating the second data cluster from the second training input set under the situation in which the channel aging does not occur for each of the regions RG1 to RG3.

In addition, the neural network model described with reference to FIGS. 9A and 9B is an example, and thus embodiments are not limited thereto. The neural network model may be trained in various ways so as to accurately determine whether the channel aging is predicted to occur with high probability.

Figure 10:
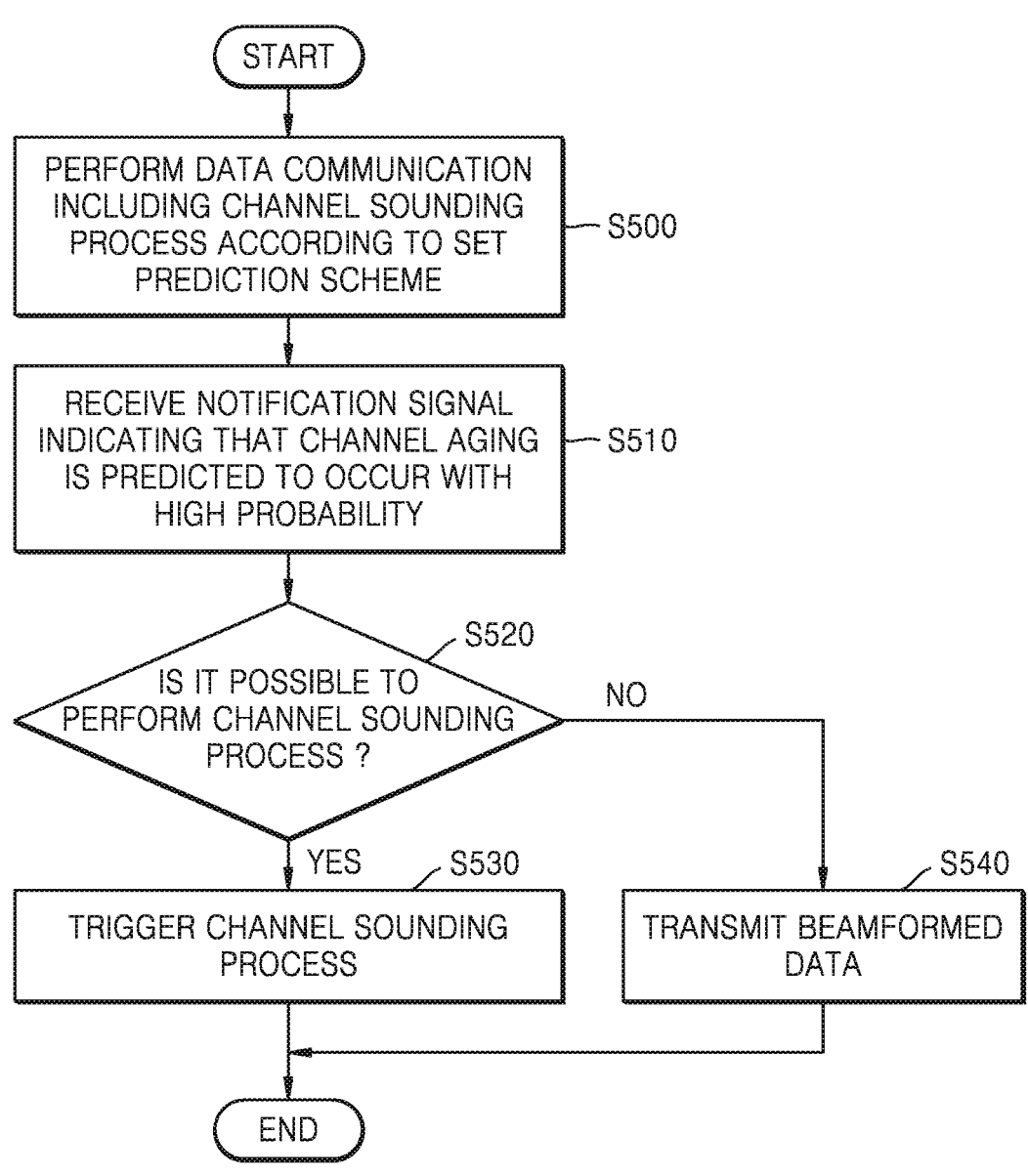
FIG. 10 is a flowchart for operating an access point, according to an embodiment of the inventive concept.

FIG. 10 is a flowchart for describing a method of operating an access point, according to an embodiment of the present disclosure.

Referring to FIG. 10, in operation S500, the access point may perform the data communication including the channel sounding process according to the set prediction scheme with the station. The set prediction scheme may match at least one of the prediction schemes described. In some embodiments, the access point may measure the beamforming data throughput and may trigger the channel sounding process based on the measurement result.

In operation S510, the access point may receive a notification signal from the station indicating that the probability of the channel aging occurrence is high. According to an embodiment, the station may generate the notification signal based on the decoding result of the beamformed data received from the access point. In some cases, the station may generate and transmit the notification signal to the access point when the number of times the decoding on the beamformed data fails exceeds the threshold value.

In operation S520, the access point may determine whether the channel sounding process may be performed in response to the notification signal. In some cases, the access point may determine whether the current data communication section is terminated and the channel sounding process may be triggered considering the current status, etc. Thus, the access point may not necessarily trigger the channel sounding process in response to the notification signal from the station, but may determine whether the channel sounding may be performed considering the current communication environment, etc. In some cases, the access point may directly trigger the channel sounding process in response to the notification signal, without performing operation S520.

When operation S520 is YES, i.e., in operation S530, the access point may trigger the channel sounding process with the station.

When operation S520 is NO, i.e., in operation S540, the access point may transmit the beamformed data to the station.

Figure 11:
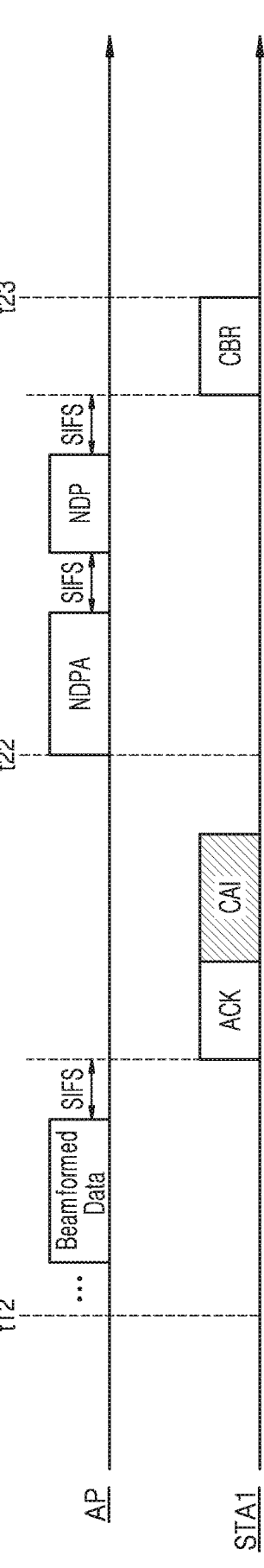
FIG. 11 is a timing diagram for describing the example of FIG. 10.

FIG. 11 is a timing diagram for further describing the example of FIG. 10.

Referring to FIG. 11, a section between time t12 and t22 is a data communication section and a section between time t22 and t23 is a section in which the channel sounding process triggered by a notification signal CAI is performed.

The station STA1 may extract information from beamformed data by decoding the beamformed data received in the data communication section. In some cases, the station STA1 may count the number of times the decoding fails when performing the decoding operation on the beamformed data. When the number of times the decoding operation fails exceeds the threshold value, the station STA1 may generate a notification signal CAI indicating that the probability of channel aging occurrence is high. The notification signal CAI may be referred to as a channel aging indicator.

According to an embodiment, the station STA1 may transmit the notification signal CAI to the access point AP following the ACK signal with respect to the beamformed data.

According to an embodiment, the access point AP may determine to trigger the channel sounding process in response to the notification signal CAI and may perform the channel sounding process between time t22 and t23.

Figure 12:
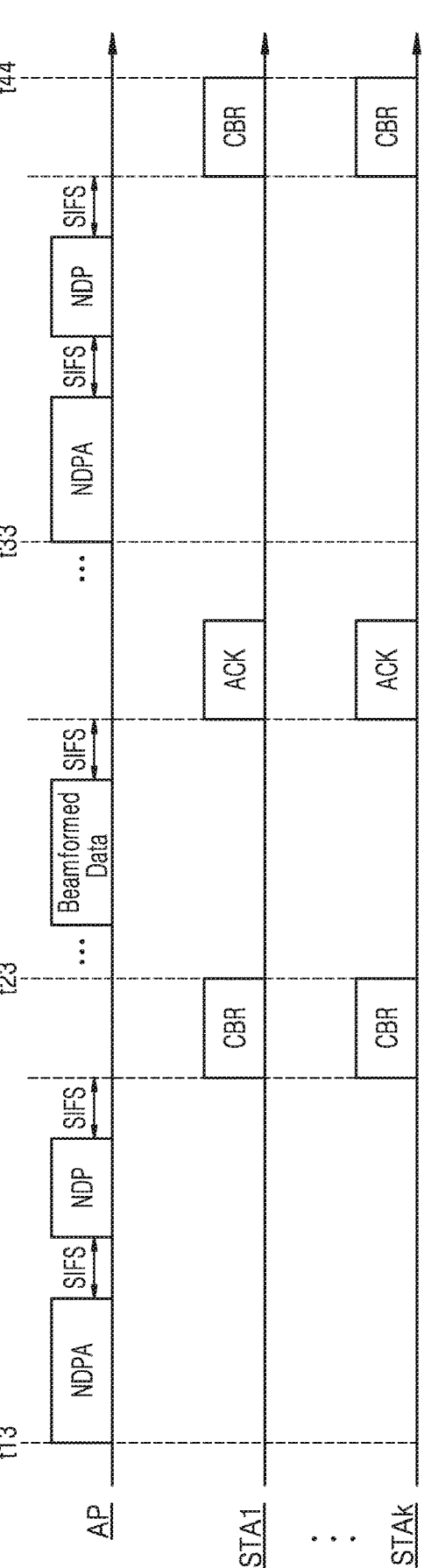
FIG. 12 is a timing diagram for describing an operating method of an access point communicating with a plurality of stations according to an embodiment of the inventive concept.

FIG. 12 is a timing diagram for describing an operating method of an access point communicating with a plurality of stations according to an embodiment of the inventive concept.

Referring to FIG. 12, the access point AP may perform communication with the plurality of stations STA1 to STAk via a plurality of channels. A section between time t13 and t23 is a section in which the channel sounding process between the access point AP and the plurality of stations STA1 to STAk is performed. A section between time t23 and t33 is a section in which the data communication between the access point AP and the plurality of stations STA1 to STAk is performed. A section between time t33 and time t43 is a section in which the channel sounding process between the access point AP and the plurality of stations STA1 to STAk is performed.

According to an embodiment, the access point AP may collect the data regarding the current states of the channels using signals received from the plurality of stations STA1 to STAk in the section in which the data communication is performed. Further, the access point AP may predict the probability of the channel aging occurrence based on the collected data and the prediction scheme. Here, the prediction scheme generates the value indicating the probability of the channel aging occurrence in consideration of the communication with the plurality of stations STA1 to STAk.

For example, the probability of channel aging occurrence generated based on the prediction scheme may be based on Equation 11.

$$\sigma_H^2 = \frac{1}{N_k} \sum {}_{u=0}^{N_k-1} \sigma_H^2(u) \tag{11}$$

Here, $N_k$ denotes the number of stations STA1 to STAk, $\sigma_H^2(u)$ denotes the temporal distributions of first channel information collected using the ACK signal received from a u-th station STAu based on the first prediction scheme described with reference to FIG. 5A. $\sigma_H^2$ may correspond to an average value of the distributions corresponding to the plurality of stations STA1 to STAk. The access point AP may determine whether the generation of channel aging is predicted with a high probability based on whether $\sigma_H^2$ exceeds the threshold value.

According to an example, the probability of channel aging occurrence generated based on the prediction scheme may be based on Equation 12.

$$\sigma_H^{2\prime} = \max_{u=0}^{N_k-1} \sigma_H^2(u) \tag{12}$$

$N_k$ denotes the number of stations STA1 to STAk, $\sigma_H^2(u)$ denotes the temporal distributions of first channel information collected using the ACK signal received from a u-th station STAu based on the first prediction scheme described with reference to FIG. 5A. $\sigma_H^{2\prime}$ may correspond to the maximum distribution from among the distributions corresponding to the plurality of stations STA1 to STAk. The access point AP may determine whether the channel aging is predicted to occur with a high probability based on whether $\sigma_H^{2\prime}$ exceeds the threshold value.

According to some embodiments, the prediction scheme with respect to the plurality of stations STA1 to STAk may be at least one of the second prediction scheme of FIG. 5B and the third prediction scheme of FIG. 5C.

According to some embodiments, the access point AP may trigger the channel sounding process with respect to the plurality of stations STA1 to STAk based on the notification signal received from at least one of the plurality of stations STA1 to STAk. The access point AP may trigger the channel sounding process with respect to the plurality of stations STA1 to STAk when the number of notification signals received from at least one of the plurality of stations STA1 to STAk exceeds a threshold value.

However, embodiments in which the probability of the channel aging occurrence is predicted according to at least one of Equation 11 and Equation 12 above are examples, and embodiments are not limited thereto. Thus, the probability of the channel aging occurrence may be variously predicted based on a combination of Equation 11 and Equation 12 or another equation.

Figure 13:
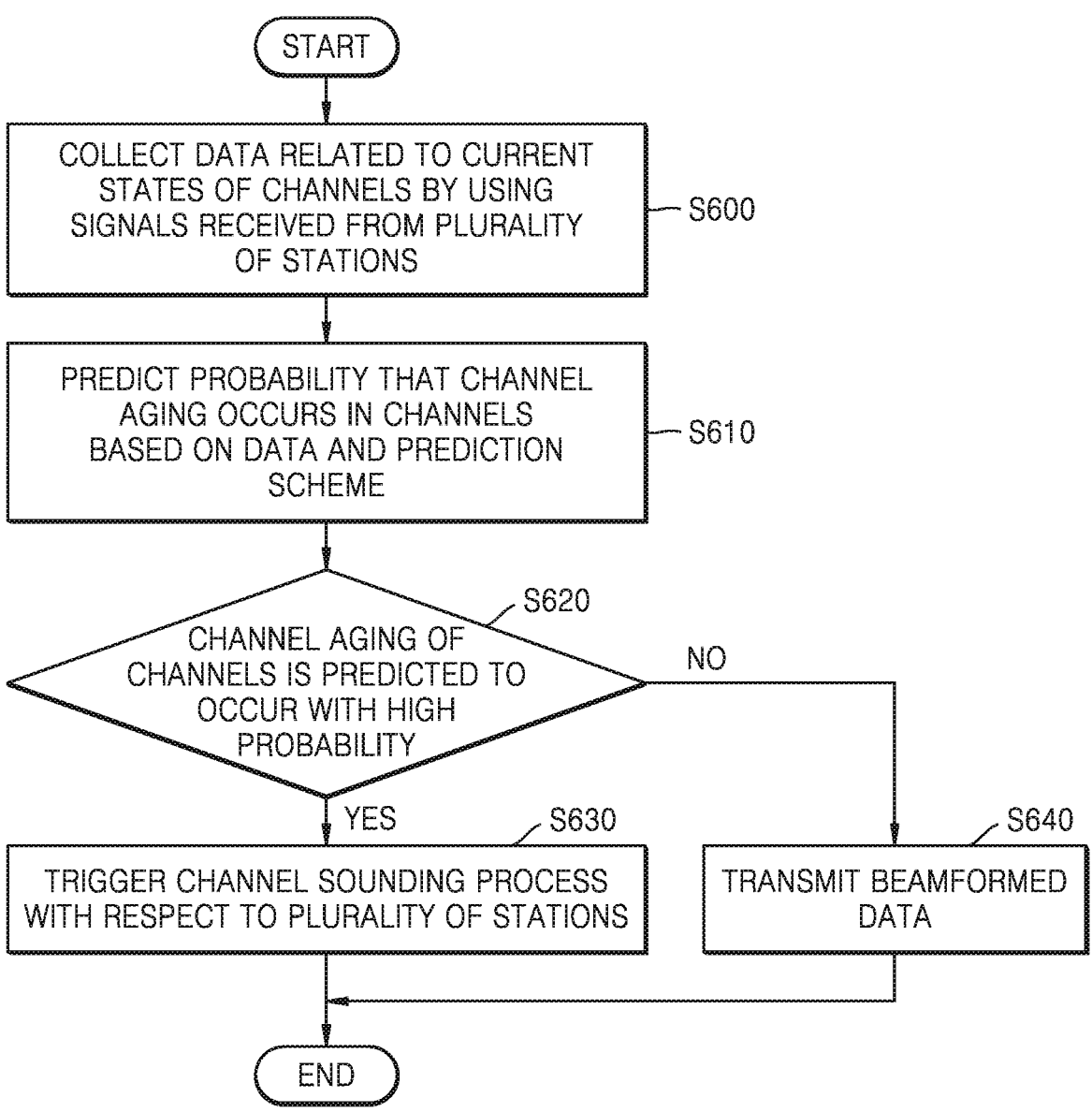
FIG. 13 is a flowchart for describing the embodiment of FIG. 12.

FIG. 13 is a flowchart for describing the embodiment of FIG. 12.

Referring to FIG. 13, in operation S600, the access point may collect the data related to the current states of the channels using the signals received from the plurality of stations.

In operation S610, the access point may predict the probability of channel aging occurrence based on the data collected in operation S600 and the prediction scheme.

In operation S620, the access point may determine whether the channel aging is predicted to occur with high probability.

When operation S620 is YES, i.e., in operation S630, the access point may trigger the channel sounding process with respect to the plurality of stations.

When operation S620 is NO, i.e., in operation S640, the access point may transmit the beamformed data to the plurality of stations.

Figure 14:
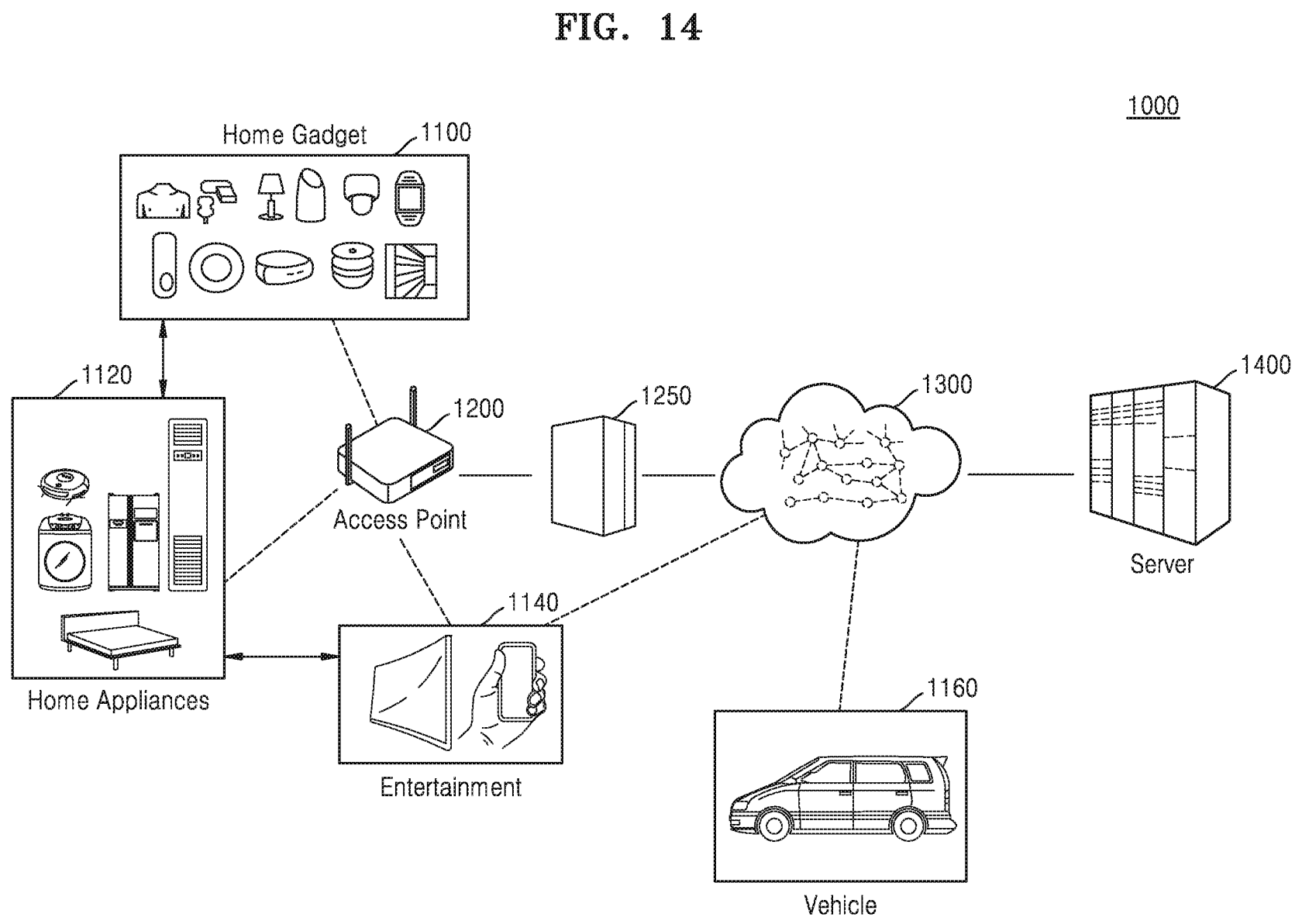

FIG. 14 is a conceptual diagram of an internet of things (IoT) network system 1000 to which one or more embodiments of the inventive concept are applied.

Referring to FIG. 14, the IoT network system 1000 may include a plurality of IoT devices 1100, 1120, 1140, and 1160, an access point 1200, a gateway 1250, a wireless network 1300, and a server 1400. The IoT may denote a network among objects using wired/wireless communication.

The IoT devices 1100, 1120, 1140, and 1160 may form a group according to characteristics of the IoT devices. For example, the IoT devices may be grouped as a home gadget group 1100, an electronic appliance/furniture group 1120, an entertainment group 1140, or a vehicle group 1160. The plurality of IoT devices 1100, 1120, and 1140 may be connected to a communication network or another IoT device via the access point 1200. The access point 1200 may be built in an IoT device. The gateway 1250 may change a protocol such that the access point 1200 is connected to an external wireless network. The IoT devices 1100, 1120, and 1140 may be connected to an outer communication network via the gateway 1250. The wireless network 1300 may include Internet and/or a public network. The plurality of IoT devices 1100, 1120, 1140, and 1160 may be connected to the server 1400 providing certain service via the wireless network 1300, and the user may utilize the service through at least one of the plurality of IoT devices 1100, 1120, 1140, and 1160.

According to embodiments of the inventive concept, the plurality of IoT devices 1100, 1120, 1140, and 1160 may predict the probability of generating channel aging and may trigger the channel sounding process based on the prediction result. As such, the IoT devices 1100, 1120, 1140, and 1160 may perform efficient and effective communication to provide users with high quality services.

While the inventive concept has been particularly shown and described with reference to embodiments thereof, it will be understood that various changes in form and details may be made therein without departing from the spirit and scope of the following claims.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. An operating method of a first device in a wireless local area network (WLAN) system comprising:
   collecting data of a current state of a channel based on a signal received from a second device:
   predicting a probability of channel aging based on the data; and
   triggering a channel sounding process based on the prediction,
   wherein the collecting of the data comprises:
      receiving from the second device, an ACK signal corresponding to beamformed data transmitted from the first device to the second device; and
      generating first channel information corresponding to one or more sub-channels in the channel based on the ACK signal, and
   wherein the predicting of the probability of the channel aging comprises:
      extracting a distribution with a maximum value from among distributions of the first channel information;
      comparing the maximum value with a first threshold value to generate a first comparison; and
      determining that the channel aging is predicted to occur based on the first comparison.

2. The operating method of claim 1, wherein the predicting of the probability of the channel aging further comprises:
   generating an input set including a result of applying a prediction scheme to the data;
   inputting the input set to a neural network model; and
   determining that the channel aging is predicted to occur with high probability based on an output from the neural network model.

3. The operating method of claim 2, wherein the neural network model is trained based on a supervised learning method, and
   the input set includes a first value related to a channel distribution.

4. The operating method of claim 2, wherein the neural network model is trained based on an unsupervised learning method, and
   the input set includes a first value related to a channel distribution.

5. The operating method of claim 1, further comprising:
   performing a channel sounding process with the second device;
   updating a beamforming matrix based on an estimated value of the channel in the channel sounding process; and
   transmitting beamformed data based on the updated beamforming matrix to the second device.

6. An operating method of a first device in a wireless local area network (WLAN) system comprising:
   performing data communication including a channel sounding process based on a prediction scheme with a second device via a channel;
   receiving a notification signal indicating that a probability of channel aging occurrence is high;
   determining that the channel sounding process is possible based on the notification signal; and
   triggering the channel sounding process based on the determination, wherein the notification signal is received after an acknowledge (ACK) signal corresponding to beamformed data is transmitted from the first device to the second device.

7. The operating method of claim 6, wherein the performing of the data communication comprises:
   collecting data from the second device for controlling the channel sounding process;
   predicting the channel aging based on the data; and
   determining the performing of the channel sounding process based on the prediction.

8. An operating method of an access point (AP) in a wireless local area network (WLAN) system comprising:
   collecting data of a current state of one or more channels based on signals received from a plurality of STAs;
   predicting a probability of channel aging based on the data; and
   triggering a channel sounding process based on the prediction,
   wherein the collecting data of the current state comprises:
      measuring a signal-to-noise ratio (SNR) of the signals; and
      determining a threshold value based on the SNR, and
   wherein the predicting the probability of channel aging comprises:
      comparing a result of applying a first prediction scheme to the data with the threshold value; and
      determining that the channel aging is predicted to occur with high probability based on the comparison.

9. The operating method of claim 8, wherein the predicting the probability of channel aging further comprises:

determining that the channel aging is predicted with high probability based on one of an average value of the data and a maximum value of the data according to the first prediction scheme.

* * * * *